United States Patent Office 3,012,996
Patented Dec. 12, 1961

3,012,996
PROCESS FOR POLYMERIZING ALPHA-OLEFINS TO HIGH POLYMERS
John William McFarland, Wilmington, Del., assignor to E. I. du Pont de Nemours and Company, Wilmington, Del., a corporation of Delaware
No Drawing. Filed Apr. 2, 1958, Ser. No. 725,798
6 Claims. (Cl. 260—79.3)

This invention is directed to the polymerization of olefins and more particularly to their polymerization in certain solvents, which allow subsequent chlorination or chlorosulfonation in the same solution.

Ethylene and other alpha-olefins may be polymerized even at moderate temperatures and pressures by means of the so-called coordination catalysts usually made from compounds of metals of groups IV to VIB and organometallic compounds of elements of groups I, II and IIIA. In addition to the convenience of these moderate conditions, the process has further advantages, such as giving almost entirely linear polyethylenes and readily giving high-molecular homopolymers and copolymers of the higher olefins which are difficult or impossible to obtain by other polymerization methods. These polymers and copolymers have valuable properties themselves and are also valuable intermediates for elastomeric and other chlorination and chlorosulfonation products. In making the latter, according to usual methods, the olefin is first polymerized in a dilute solution in an aliphatic or cycloaliphatic hydrocarbon, and the polymer is then isolated by precipitation with an alcohol or by distilling off the solvent. The solid polymer is then redissolved in a highly chlorinated solvent such as carbon tetrachloride, treated with chlorine or with chlorine and sulfur dioxide, and finally isolated as the chlorinated or chlorosulfonated product. It would be advantageous, simpler and cheaper to be able to carry out the polymerization and chlorination or chlorosulfonation in the same solution, thus eliminating the steps of isolating and then redissolving the olefin polymers and further eliminating the use of a second quantity of solvent. Until recently, however, no solvent known to be suitable for one reaction, was operable for the other. Thus the catalytic polymerization, since the catalyst contains highly reactive organometallic compounds, can be carried out in only the least reactive solvents. When the usual coordination catalysts are used, even solvents such as carbon tetrachloride in which the chlorinations and chlorosulfonations are usually carried out, are unsuitable. They lead to the formation of little or no solid polymer or of liquid polymers of very low molecular weight. On the other hand, the aliphatic and cycloaliphatic hydrocarbons which are the only organic solvents which are practical for the catalytic polymerization obviously are far too reactive toward chlorine to be used as solvents for chlorination.

Recently, it has been found that silicon tetrachloride when used as the solvent does not interfere with the polymerization of olefins to solid polymers by means of the usual coordination catalysts and also is entirely suitable as the solvent in the chlorination and sulfochlorination reactions. Hence this solvent may be used in both the polymerization and chlorination steps and greatly simplifies the over-all process. Silicon tetrachloride, however, is relatively expensive and rather difficult to handle. Another method is therefore desirable for solving the problem of polymerizing olefins to high-molecular products and chlorinating or chlorosulfonating them, all in the same solution.

It has been found that a specific group of catalysts is active in polymerizing olefins to high polymers in certain highly halogenated solvents, such as carbon tetrachloride, which are unsuitable for the usual coordination catalysts.

It is an object of the present invention to provide a process for polymerizing olefins in certain solvents permitting subsequent chlorination and chlorosulfonation in the same solution. It is a further object of the present invention to provide a process which gives solutions of polyolefins suitable as coating compositions. These and other objects will become apparent in the following description and claims.

More specifically, the present invention is directed to the polymerization of alpha-olefins in highly chlorinated aliphatic solvents by means of catalysts made from compounds of elements of groups IVB, VB, and VIB of the periodic system and organometallic compounds of aluminum in which the aluminum is directly attached to at least one and not more than two alkyl groups, the remaining valences of the aluminum being satisfied by alkoxy groups, and subsequently chlorinating or sulfochlorinating the resulting polymer solution as desired.

The highly halogenated aliphatic hydrocarbon solvent should contain not more than one and preferably no unsubstituted hydrogen atom. The halogen is preferably chlorine, although fluorine is very useful along with chlorine. Carbon tetrachloride is the particularly preferred solvent, others are trichlorofluoromethane, chloroform, 1,1,2,2-tetrachloro-1,2-difluoroethane, and 1,2-dichloro-1,1,2,2-tetrafluoroethane.

The titanium halide catalyst component will preferably be a chloride. The alkyl groups in the aluminum compound, those attached both directly and through oxygen, may be the same or different and may be straight or branched, long or short, although those containing not more than four carbon atoms are preferred because of their ready availability. The ratio of the organometallic aluminum compound to the titanium halide is such as to reduce at least part of the latter metal to a valence of two.

The present invention does not reside in the coordination catalyst itself but in its preparation and use, for polymerizing olefins, in a highly halogenated aliphatic solvent. The undesirable effect of such solvents upon polymerization of olefins to high-molecular products by means of the usual coordination catalysts has been repeatedly disclosed. An Australian application 23,304 of 1956 uses small proportions of such solvents, particularly carbon tetrachloride, in aliphatic hydrocarbon solvents, to reduce the molecular weight of the polyethylenes normally formed by coordination catalysts. The disclosure therein of coordination catalysts made from alkoxyethylaluminum as equivalent to those made from trialkylaluminum leads away from the present invention.

Although the principal use of the process of the present invention for polymerizing olefins in halogenated solvents is to give solutions which may be chlorinated and chlorosulfonated, the process has other uses, such as to give solutions of polyolefins suitable as coating compositions.

Although the process of the present invention may be applied to all aliphatic alpha-mono-olefins, it is particularly suitable for polymerizing ethylene and propylene alone, and for copolymerizing these together or with other lower olefins.

The subsequent chlorosulfonation may be carried out as described for polyethylene in U.S. 2,586,363 and for ethylene-propylene copolymers using free-radical catalysts such as disclosed in U.S. 2,640,048 and 2,507,699. Before proceeding with the chlorination or chlorosulfonation, it is well to inactivate the polymerization catalyst by adding a small quantity of a compound with which it will react, such as an alcohol.

Representative examples illustrating the present invention are as follows.

Example 1

A catalyst was prepared under nitrogen from 2.6 g. (.02 mole) of diethylaluminum ethoxide and 1.9 g. (0.01 mole) of titanium tetrachloride in 25 cc. of carbon tetrachloride. To the brown precipitate of catalyst was then added an additional 600 cc. of $CCl_4$. Ethylene was passed into the flask at 30 mm. positive mercury pressure during 5⅔ hours. The exothermic reaction maintained the temperature at 40–60° C. At the conclusion of polymerization, the reaction product was poured into 500 cc. of isopropyl alcohol. The precipitated product was washed with acetone and amounted to 58 g. of white powder. It contained 1.12% chlorine and had a melt index of 0.38.

Under similar conditions, a catalyst made from 0.01 mole of triisobutylaluminum and 0.005 mole of titanium tetrachloride in 250 cc. of carbon tetrachloride gave only 3 g. of polymer in 2 hours, at the end of which time absorption of ethylene had practically stopped.

Substitution of the diethylaluminum ethoxide by diisobutylaluminum ethoxide and proproxide gave active catalysts in the carbon tetrachloride solution.

When ethyl aluminum diethoxide is utilized instead of diethyl aluminum ethoxide, a similar catalyst results; however, the dialkyl monoalkoxides are preferred.

Example 2

A 450-cc. stainless steel bomb was charged with 2.6 g. (0.02 mole) of diethylaluminum ethoxide, 1.9 g. (0.01 mole) of titanium tetrachloride and 125 cc. carbon tetrachloride. Ethylene was introduced into the bomb to give a pressure of 500 p.s.i.g. During one hour, pressure was maintained at 400–500 p.s.i.g. and the heat of reaction maintained temperature at 50–115° C. Isolation of the product as in Example 1 gave 65 g. of polyethylene; melt index 1.27; percent Cl 1.5.

Under similar conditions, using triisobutylaluminum, instead of diethylaluminum ethoxide, only 2.1 g. of polymer was formed.

Example 3

To a 450-cc. stainless steel bomb were charged 0.02 mole of diisobutylaluminum ethoxide, 0.01 mole of $TiCl_4$ and 125 cc. of $CCl_4$. The bomb was pressured to 500 p.s.i.g. with ethylene and maintained at 400–500 p.s.i.g. during one hour. The temperature rose to 105° C. upon first pressuring bomb, but slowly dropped during the hour. The polyethylene isolated weighed 51 g.; melt index 1.24; percent Cl 1.45.

Example 4

To a 1-liter flask were added 0.02 mole of diethylaluminum ethoxide and 0.01 mole of titanium tetrachloride in 625 cc. of carbon tetrachloride. An ethylenepropylene mixture containing 21% propylene was passed into the flask at about 30 mm. pressure during six hours at 32–58° C. A 200-cc. portion of the mixture was removed and poured into isopropyl alcohol. The precipitated white elastomer was isolated and weighed 9.8 g.; it contained 1.07% chlorine and 15% propylene and had a melt index of 165. The total yield of copolymer was thus 31 g.

Only oily polymers were obtained when triisobutylaluminum was used in place of diethylaluminum ethoxide.

Example 5

To the remainder of the solution of ethylenepropylene copolymer in $CCl_4$ obtained in Example 4 was added 5 cc. of isopropyl alcohol to deactivate catalyst. Then 0.03 g. of azobis(isobutyronitrile) catalyst was dissolved in the solution, followed by simultaneous addition of 6 g. of $Cl_2$ and 18 g. of $SO_2$ during three hours at 63.5–68° C., with agitation and exposure to intense light from an incandescent lamp. The solution was then degassed with nitrogen at reflux temperature for one-half hour, then stabilized with 0.3 g. of the reaction product (Epon resin) of one mole of diphenylol propane with two moles of epichlorhydrin. A portion of the product was then precipitated by pouring its solution into two volumes of isopropyl alcohol. The dried product contained 8.15% chlorine and 2.45% sulfur and had elastomeric properties resembling those of chlorosulfonated ethylene-propylene copolymers.

The main portion of the carbon tetrachloride solution of the chlorosulfonated copolymer was used for further reaction with an unsaturated amine according to U.S. Patent No. 2,852,497. The above degassed and stabilized solution was treated with 5 g. of allylamine in 15 cc. of $CCl_4$ added with stirring and cooling over a period of 5 minutes and was then heated at 60° C. for 105 minutes. The product was then precipitated and washed with alcohol, then dried in a vacuum oven at 50° C. The resulting elastomer contained 0.95% nitrogen. When compounded with 5 parts of magnesium oxide, 2 parts of benzothiazyl disulfide, 1 part of mercaptobenzothiazole, and 2 parts of sulfur per 100 parts of elastomer, and cured for 1 hour at 153° C., it gave a well-cured product with a tensile strength of 1973 lbs., a modulus at 300% elongation of 1735 lbs. and an elongation at break of 330%. It was unaffected by exposure under stress to 100 parts of ozone per million of air for 200 hrs. ("bent loop test").

Example 6

Under the conditions used in Example 4, including carbon tetrachloride as the only solvent, a mixture of ethylene and propylene containing 50% of each gave a plastic, colorless polymer containing 46% of combined propylene.

Example 7

Under the conditions used in Example 4, including carbon tetrachloride as the only solvent, a plastic polypropylene was obtained.

Example 8

Ethyl aluminum diethoxide (0.02 mole) and titanium tetrachloride (0.01 mole) were mixed in 25 cc. of carbon tetrachloride, forming a brown precipitate when heated to 80° C. in a 5-minute period. This suspension of catalyst was diluted with 300 cc. of carbon tetrachloride and ethylene was introduced, as in Example 1, the initial temperature being 25° C. The polymerization reaction was exothermic yielding a product similar to that formed in Example 1, but at a somewhat slower rate.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process of polymerizing an aliphatic alpha-mono-olefin selected from the group consisting of ethylene and propylene to high polymers in the presence of a coordination catalyst prepared from (1) a titanium halide, and (2) an aluminum organo metallic compound, the improvement wherein said aluminum compound is an alkyl alkoxide organo metallic compound, the aluminum of said alkyl alkoxide organo metallic compound being directly attached to at least one and not more than two alkyl groups, the remaining valences of the aluminum being satisfied by alkoxy groups, said polymerization being carried out in a highly chlorinated aliphatic hydrocarbon solvent.

2. The process of claim 1 wherein the resulting polymer solution is chlorinated.

3. The process of claim 1 wherein the resulting polymer solution is chlorosulfonated.

4. The process of claim 1 wherein the alkyl group has from 1 to 4 carbon atoms.

5. The process of claim 1 wherein the catalyst is prepared from titanium tetrachloride and diethyl aluminum ethoxide.

6. The process of claim 1 wherein the solvent is carbon tetrachloride.

References Cited in the file of this patent

UNITED STATES PATENTS

| | | |
|---|---|---|
| 2,695,899 | Becker et al. | Nov. 30, 1954 |
| 2,748,105 | Becker et al. | May 29, 1956 |
| 2,906,743 | Hertzer et al. | Sept. 29, 1959 |

FOREIGN PATENTS

| | | |
|---|---|---|
| 534,792 | Belgium | Jan. 31, 1955 |
| 540,362 | Belgium | Aug. 5, 1955 |
| 540,459 | Belgium | Aug. 9, 1955 |
| 23,304 | Australia | 1956 |
| 1,153,323 | France | Sept. 30, 1957 |

UNITED STATES PATENT OFFICE
CERTIFICATE OF CORRECTION

Patent No. 3,012,996            December 12, 1961

John William McFarland

It is hereby certified that error appears in the above numbered patent requiring correction and that the said Letters Patent should read as corrected below.

Column 2, lines 12 to 14, strike out "compounds of elements of groups IVB, VB, and VIB of the periodic system", and insert instead -- a titanium halide --.

Signed and sealed this 30th day of July 1963.

(SEAL)
Attest:

ERNEST W. SWIDER            DAVID L. LADD
Attesting Officer            Commissioner of Patents